United States Patent [19]

Dimroth et al.

[11] 4,116,953
[45] Sep. 26, 1978

[54] AZO DYES

[75] Inventors: Peter Dimroth, Mannheim; Helmut Junge, Wachenheim; Peter Tonne, Neustadt; Rolf Urtel, Frankenthal, all of Fed. Rep. of Germany

[73] Assignee: BASF Aktiengesellschaft, Ludwigshafen, Fed. Rep. of Germany

[21] Appl. No.: 723,916

[22] Filed: Sep. 16, 1976

[30] Foreign Application Priority Data

Oct. 4, 1975 [DE] Fed. Rep. of Germany ....... 2544568

[51] Int. Cl.$^2$ ...................... C09B 29/20; C09B 29/22; C09B 29/32; C09B 29/36
[52] U.S. Cl. .................................. 260/157; 260/144; 260/152; 260/154; 260/155; 260/156; 260/162; 260/193; 260/203; 544/92; 544/183
[58] Field of Search .................... 260/152, 157, 244 R

[56] References Cited

FOREIGN PATENT DOCUMENTS 2,329,781 1/1975 Fed. Rep. of Germany ........... 260/152

Primary Examiner—Charles F. Warren
Attorney, Agent, or Firm—Keil, Thompson & Shurtleff

[57] ABSTRACT

Compounds of the formula

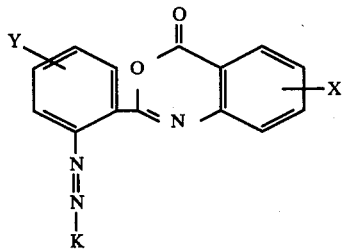

in which
K is the radical of a coupling component;
X is hydrogen, chloro, bromo, methyl or nitro; and
Y is hydrogen, chloro, bromo or methyl.

The compounds are eminently suitable as pigments for coloring printing inks, surface coatings and resins with exceptional fastness properties.

4 Claims, No Drawings

AZO DYES

The invention relates to dyes of the general formula (I):

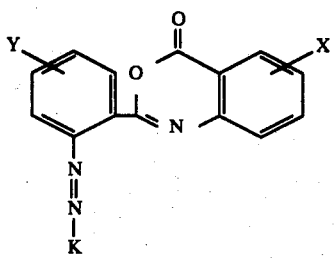

in which

K is the radical of a coupling component;
X is hydrogen, chloro, bromo, methyl or nitro; and
Y is hydrogen, chloro, bromo, or methyl.

Examples of coupling components are compounds of the phenol, naphthol, acetoacetarylide, pyrazolone, quinolone, pyridone, pyrimidone or isoquinolone series.

Preferred coupling components are represented by one of the members

$CH_3COCHCONHZ$ or

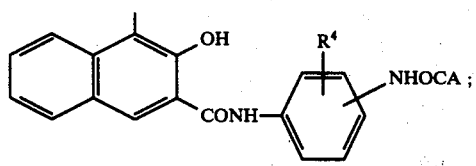

wherein

Z is phenyl substituted by chloro, bromo, methyl, ethyl, methoxy, ethoxy, acetylamino, propionylamino, benzoylamino, chlorobenzoylamino or dichlorobenzoylamino; or

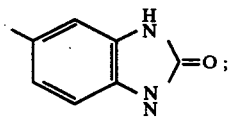

A is

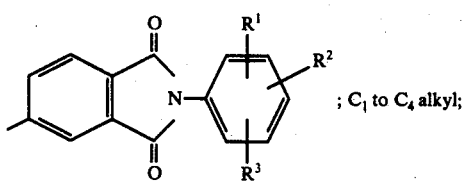  ; $C_1$ to $C_4$ alkyl;

phenyl; phenyl which is ring-substituted by chloro, bromo, methyl, ethyl, methoxy, ethoxy, cyano, carbamoyl, N-phenylcarbamoyl, N-chlorophenylcarbamoyl, N-bromophenylcarbamoyl, N-methylphenylcarbamoyl, N-methoxyphenylcarbamoyl, N-ethoxyphenylcarbamoyl, $C_1$ to $C_4$ alkoxycarbonyl or sulfamoyl; naphthyl; anthraquinonyl; amino; $C_1$ to $C_5$ alkylamino; benzylamino; phenylamino; phenylamino which is ring-substituted by chloro, bromo, methyl, ethyl, methoxy, ethoxy or carbamoyl; naphthylamino; anthraquinonylamino; phenoxy; or phenoxy which is ring-substituted by chloro, bromo, methyl, ethyl, methoxy or ethoxy;

$R^1$ is hydrogen, chloro, bromo, $C_1$ to $C_4$ alkyl, $C_1$ to $C_4$ alkoxy, phenyl, methylsulfonyl, ethylsulfonyl, carbamoyl or sulfamoyl;

$R^2$ is hydrogen, chloro, bromo, methyl, ethyl, methoxy or ethoxy;

$R^3$ is hydrogen, chloro, bromo, methyl or ethyl; and $R^4$ is hydrogen, chloro, bromo, methyl, ethyl, methoxy or ethoxy.

Examples of specific coupling components are: phenol, o-cresol, m-cresol, p-cresol, α-naphthol, β-naphthol, esters, amides and hydrazides of 2-naphthol-3-carboxylic acid, acetoacetanilide, acetoacet-o-anisidide, 1-phenyl-3-methylpyrazolone, 1-phenylpyrazolone-3-carboxylic esters or amides, 2,4-dihydroxyquinoline, N-methyl-4-hydroxyquinolone-2, 2,6-dihydroxy-3-cyano-4-methylpyridine, 2,6-dihydroxy-3-carbamoyl-4-methylpyridine, N-methyl-2-hydroxy-3-cyano-4-methylpyridone-6, N-γ-methoxypropyl-2-hydroxy-3-cyano-4-methylpyridone-6, N-butyl-2-hydroxy-3-cyano-4-methylpyridone-6, 2-amino-4,6-dihydroxypyrimidine, 2,4-dihydroxy-6-aminopyrimidine, 2,4-diamino-6-hydroxypyrimidine, 1,3-dimethyl-4-hydroxypyrimidinedione-2,6 and 1,3-dihydroxyisoquinoline.

Dyes of the formula (I) may be prepared by reacting a diazo compound of an amine of the formula (II):

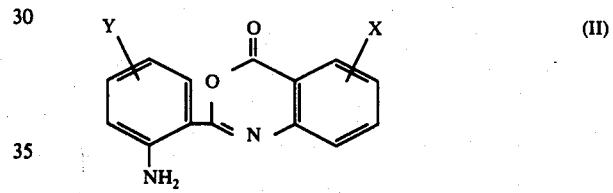

with a coupling component of the formula (III):

HK    (III)

Triazinones of the formula (IV):

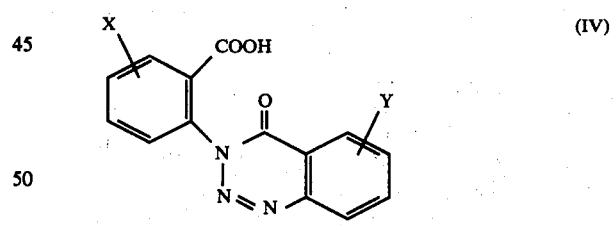

may also be reacted with coupling components of the formula (III) at elevated temperature and preferably in an inert organic solvent to form compounds of the formula (V):

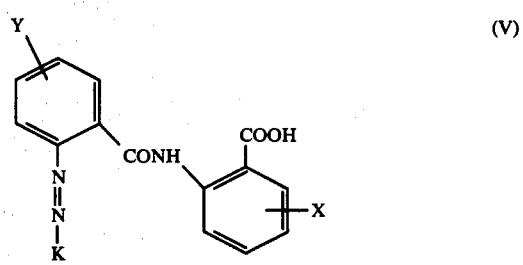

from which compounds of the formula (I) may be obtained by elimination of water by a conventional method, for example with thionyl chloride or phosgene.

To prepare dyes with 2-naphthol-3-carboxamide components it may be convenient to start from acid chlorides of the formula:

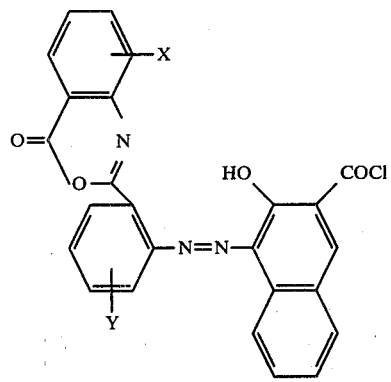

and to convert these into the dye amides by reaction with the appropriate amines by a conventional method.

Dyes suitable as pigments include particularly the compounds of the formula (I) in which K is the radical of a coupling component of the β-naphthol, acetoacetarylide, pyrimidine, dihydroxyquinoline or dihydroxypyridine series. These dyes are distinguished by fairly great insolubility in conventional solvents and almost all of them exhibit as pigments high color strength, good fastness to overcoating, migration and overspraying and some of them very good lightfastness. The new dyes are suitable for example as disperse dyes for dyeing fibrous materials or as dyes for coloring high molecular weight organic material, for example cellulose ethers, cellulose esters, superpolyamides, superpolyurethanes, polyesters, acetylcellulose, nitrocellulose, natural resins or synthetic resins such as polymerization resins or condensation resins, for example aminoplasts and particularly urea-formaldehyde resins and melamineformaldehyde resins, alkyd resins, phenolic plastics, polycarbonates, polyolefins such as polystyrene, polyvinyl chloride, polyethylene, polypropylene, polyacrylonitrile, polyacrylic esters, rubber, casein, silicones and silicone resins. They are moreover suitable for the production of print pastes for various purposes, polymer dispersions and surface coatings, for example based on melamine resins, acrylate resins or other materials.

Pigments of the formula (I) are not always obtained in the optimum form for a specific purpose. They may however be converted into the most suitable form by known methods such as grinding with salt or heating in water or solvent.

A group of dyes particularly preferred industrially has the general formula (Ia):

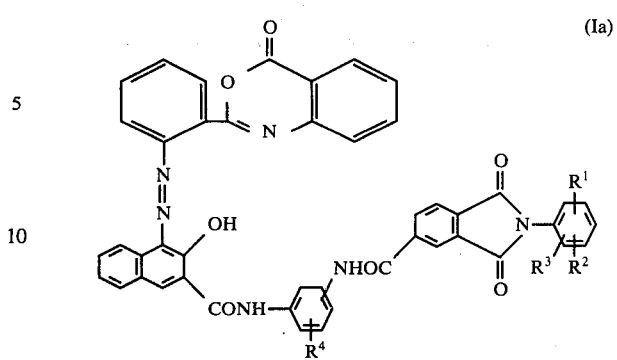

in which
R$^1$ is hydrogen, chloro, bromo, C$_1$ to C$_4$ alkyl, C$_1$ to C$_4$ alkoxy, phenyl, methylsulfonyl, ethylsulfonyl, carbamoyl or sulfamoyl;
R$^2$ is hydrogen, chloro, bromo, methyl, ethyl, methoxy or ethoxy;
R$^3$ is hydrogen, chloro, bromo, methyl or ethyl; and
R$^4$ is hydrogen, chloro, bromo, methyl, ethyl, methoxy or ethoxy.

Another group of preferred dyes has the formula (Ib):

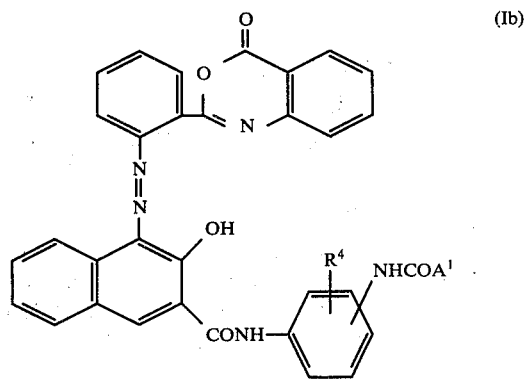

in which
A$^1$ is C$_1$ to C$_4$ alkyl; phenyl; phenyl substituted by chloro, bromo, methyl, ethyl, methoxy, ethoxy, cyano, carbamoyl, N-phenylcarbamoyl, N-chlorophenylcarbamoyl, N-bromophenylcarbamoyl, N-methylphenylcarbamoyl, N-methoxyphenylcarbamoyl, N-ethoxyphenylcarbamoyl, C$_1$ to C$_4$ alkoxycarbonyl or sulfamoyl; naphthyl; anthraquinonyl; amino; C$_1$ to C$_5$ alkylamino; benzylamino, phenylamino, phenylamino substituted by chloro, bromo, methyl, ethyl, methoxy, ethoxy or carbamoyl; naphthylamino; anthraquinonylamino, phenoxy; or phenoxy substituted by chloro, bromo, methyl, ethyl, methoxy or ethoxy; and R$^4$ has the meanings given for formula (Ia).

The CONH— and NHOC—groups are preferably in the para-position to one another.
R$^1$ is preferably hydrogen, chloro, bromo, methyl, ethyl, methoxy or ethoxy;
R$^2$ is preferably hydrogen, chloro, methyl, ethyl, methoxy or ethoxy;
R$^3$ is preferably hydrogen, chloro or methyl; and
R$^4$ is preferably hydrogen.

Pigments of the formula (Ia) are as a rule distinguished by a very brilliant hue, high tinctorial strength and excellent fastness properties, of which lightfastness, weathering fastness and migration fastness may be emphasized. The pigments may be used for all purposes where outstanding fastness properties are required.

In the following Examples, which will illustrate the invention, parts and percentages are by weight unless otherwise specified.

EXAMPLE 1

23.8 parts of 2-o-aminophenyl-4H-3,1-benzoxazin-4-one is introduced at 10° to 15° C into 100 parts of 96% sulfuric acid and diazotized at 0° to 5° C by adding 32 parts of nitrosylsulfuric acid (45%). The whole is stirred for another 2 hours at 5° C, poured onto a mixture of 500 parts of ice and 600 parts of water, then 33.8 parts of 2-naphthol-3-carboxylic acid-N-2'-methoxy-4'-nitro-phenylamide is added and a pH of 6 is set up with dilute caustic soda solution. The whole is stirred for another five hours, suction filtered and washed thoroughly with hot water. The filtered material is then stirred in 250 parts of dimethylformamide for two hours at 120° C, suction filtered, washed with methanol and dried. 49.2 parts of a brilliant red powder is obtained which has the formula:

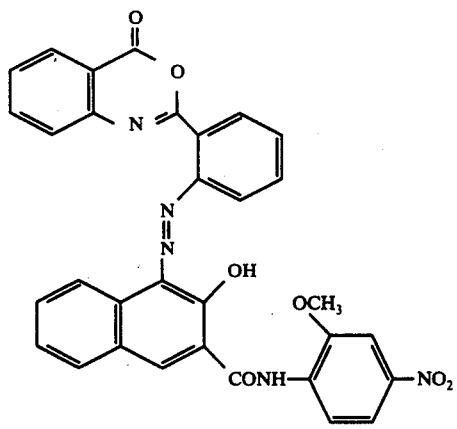

Dyes having the hues specified in the following Table are obtained analogously to Example 1 with the coupling components given in the Table:

| Ex. No. | Coupling component | Hue |
|---|---|---|
| 2 | 2,3-naphthol with CONH-(2-CH₃,4-Cl-phenyl) | red |
| 3 | 2,3-naphthol with CONH-(4-OCH₃-phenyl) | red |
| 4 | 2,3-naphthol with CONH-naphthyl | red |
| 5 | 2,3-naphthol with CONH₂ | red disp. |
| 6 | 2,3-naphthol with COOCH₃ | red disp. |
| 7 | 2,3-naphthol with COOC₂H₄—O—C₂H₄OC₄H₉ | red disp. |
| 8 | 2,3-naphthol with CONHC₂H₄OH | yellowish red disp. |
| 9 | 2-naphthol | red disp. |
| 10 | 2,3-naphthol with CONH-(4-Cl,2,5-(OCH₃)₂-phenyl) | Bordeaux |
| 11 | 1,4-naphthol with phthalazinone linkage | red |
| 12 | CH₃COCH₂CONH-(2-OCH₃-phenyl) | yellow |
| 13 | CH₃COCH₂CONH-(4-NHCOCH₃-phenyl) | yellow |
| 14 | CH₃COCH₂CONH-(4-NHCOCH₃,3-NHCOCH₃-phenyl) | yellow |
| 15 | CH₃COCH₂—CONH-(2-Cl,4-NHCO-phenyl)-phenyl | yellow |
| 16 | CH₃COCH₂CONH-benzoxazolinone | yellow |
| 17 | CH₃COCH₂CONH-benzimidazolinone | yellow |
| 18 | CH₃COCH₂CONH-(4-phenyl)-isoquinolinedione | yellow |

| Ex. No. | Coupling component | Hue |
|---|---|---|
| 19 | [structure: 4-methyl-7-(acetoacetylamino)quinolin-2(1H)-one] CH₃COCH₂CONH—quinolinone, CH₃ | yellow |
| 20 | [structure with CH₃COCH₂CONH— phenyl—N=... HN—C(=O)—benzene] | yellow |
| 21 | [structure: 2,4-dihydroxyquinoline] OH, N, OH | yellow |
| 22 | [structure: homophthalimide-like] O, NH, O | yellow |
| 23 | [bicyclic structure with N, NH] | reddish yellow |
| 24 | [pyridine: H₃C, CN, HO, N, OH] | yellow |
| 25 | [pyridine: CH₃, CONH₂, HO, N, OH] | yellow |
| 26 | [pyridine: CH₃, CN, HO, N(CH₃), OH] | yellow disp. |
| 27 | [pyridine: CN, HO, N(CH₃), OH] | yellow disp. |
| 28 | [pyrimidine: HO, NH₂, N, N, OH] | yellow |
| 29 | [pyrimidine: HO, NH₂, N, N, NH₂] | reddish yellow |
| 30 | [pyrazolone: CH₃, N, NH, O] | yellow |
| 31 | [pyrazolone with 4-chlorophenyl: CH₃, N, N, O, Cl] | yellow |
| 32 | [pyrazolone with CONH₂ and 3-sulfamoylphenyl: CONH₂, N, N, O, SO₂NH₂] | yellow |
| 33 | [2-hydroxy-3-naphthanilide: OH, CONH—phenyl] | yellow |

EXAMPLE 34

The procedure of Example 1 is repeated but 18.8 parts of β-hydroxynaphthoic acid is used as the coupling component. After coupling is over the whole is acidified and the product is suction filtered, washed with water and dried. 39.1 parts of the acid:

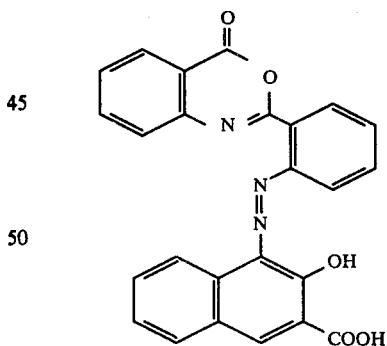

is obtained. 24.6 parts of this acid is heated with 120 parts of trichlorobenzene, 2 parts of dimethylformamide and 25 parts of thionyl chloride for five hours at 100° to 110° C. The whole is cooled to ambient temperature and suction filtered, and the product is washed first with trichlorobenzene and then with cyclohexane and then dried. 22.4 parts of the acid chloride is obtained.

13.7 parts of this acid chloride in 120 parts of nitrobenzene has 6.5 parts of p-aminobenzanilide added to it and the whole is stirred for one hour at 90° C and for four hours at 130° C. The product is suction filtered at 80° C, washed with nitrobenzene and methanol and dried. 17.3 parts of a red powder of the formula

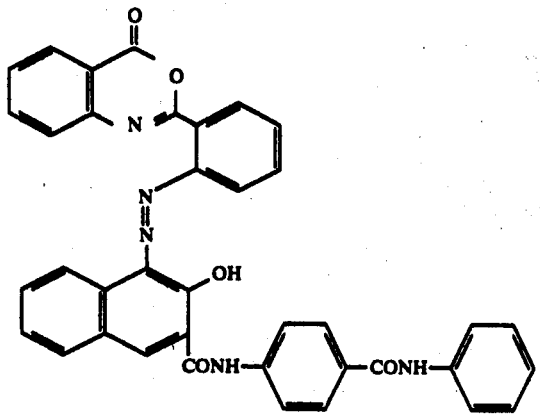

is obtained.

Dyes having the hues specified in the following Table are obtained analogously to Example 34 with the amines set out in the Table.

| Ex. No. | Amine | Hue |
|---|---|---|
| 35 | H₂N—⌬—CONH—⌬(Cl)(Cl) | red |
| 36 | H₂N—⌬—NHCO—⌬—CH₃ | red |
| 37 | H₂N—⌬—CONH—⌬(Cl)(OCH₃)(Cl) | red |
| 38 | H₂N—⌬—NHCO—⌬(Cl)(Cl)(Cl) | red |
| 39 | H₂N—⌬—NHCO—⌬(Cl)(OCH₃) | red |
| 40 | H₂N—⌬—CONH—⌬(OCH₃)(Cl)(CH₃) | red |
| 41 | H₂N—⌬(OCH₃)—NHCO—⌬—N(phthalimide) | bluish red |
| 42 | H₂N—⌬—NHCO—⌬(Cl)—N(phthalimide) | yellowish red |
| 43 | H₂N—⌬(CH₃)—CONH—⌬—N(phthalimide) | yellowish red |
| 44 | H₂N—⌬(Cl)—NHCO—⌬(Cl)—N(phthalimide) | bluish red |

-continued

| Ex. No. | Amine | Hue |
|---|---|---|
| 45 | H₂N—⟨phenyl with Cl, OCH₃, NHCO-phenyl⟩ | red |
| 46 | H₂N—⟨phenyl⟩—CONH—⟨phenyl with CH₃, C=CH, HN, C=O⟩ | chestnut |
| 47 | H₂N—⟨phenyl⟩—CONH—⟨phenyl⟩—CONH—⟨phenyl⟩ | red |
| 48 | H₂N—⟨phenyl⟩—NHCO—⟨phenyl with Cl⟩—NHCO—⟨phenyl with Cl⟩ | red |
| 49 | H₂N—⟨phenyl⟩—CONH—⟨anthraquinone⟩ | red |
| 50 | H₂N—⟨phenyl⟩—CONH—⟨phenyl⟩—SO₂NH₂ | red |
| 51 | H₂N—⟨phenyl⟩—CONH—⟨phenyl with Cl, SO₂NH-phenyl⟩ | red |
| 52 | H₂N—⟨phenyl⟩—CONH—⟨phenyl⟩—N⟨phthalimide-CONH-phenyl⟩ | chestnut |
| 53 | H₂N—⟨phenyl⟩—NHCO—⟨anthraquinone⟩ | Bordeaux |
| 54 | H₂N—⟨phenyl⟩—NHCO—⟨isoindolinone N-phenyl-OCH₃⟩ | bluish red |
| 55 | H₂N—⟨phenyl⟩—NHCO—⟨isoindolinone N-phenyl-CH₃⟩ | bluish red |
| 56 | H₂N—⟨phenyl with Cl⟩—NHCO—⟨isoindolinone N-phenyl-Cl⟩ | red |
| 57 | H₂N—⟨phenyl⟩—NHCO—⟨isoindolinone N-phenyl-C₂H₅⟩ | bluish red |
| 58 | H₂N—⟨phenyl⟩—NHCO—⟨isoindolinone N-phenyl-Cl, OCH₃⟩ | bluish red |

-continued

| Ex. No. | Amine | Hue |
|---|---|---|
| 59 | (structure) | bluish red |
| 60 | (structure) | bluish red |
| 61 | (structure) | bluish red |
| 62 | (structure) | red |
| 63 | (structure) | yellowish red |
| 64 | (structure) | red |
| 65 | (structure) | chestnut |
| 66 | (structure) | red |
| 67 | (structure) | red |
| 68 | (structure) | red |
| 69 | (structure) | bluish red |
| 70 | (structure) | bluish red |

-continued

| Ex. No. | Amine | Hue |
|---|---|---|
| 71 | H₂N–⟨⟩–NHCO–[isoquinoline-1,3-dione]–N–⟨⟩–Br | bluish red |
| 72 | H₂N–⟨⟩–N–[isoquinoline-1,3-dione]–CONH–⟨⟩(Cl)(Cl) | red |
| 73 | H₂N–⟨⟩–N–[isoquinoline-1,3-dione]–CONH–⟨⟩ | red |
| 74 | H₂N–⟨⟩–NHCO–[isoquinoline-1,3-dione]–NH | chestnut |
| 75 | H₂N–⟨⟩(CH₃)–N–[isoquinoline-1,3-dione]–CONH–⟨⟩(Cl)(Cl)(Cl) | yellowish red |
| 76 | ⟨⟩(NH₂)–N–[isoquinoline-1,3-dione]–CONH–⟨⟩(CH₃) | violet |
| 77 | ⟨⟩(NH₂)–CONH–⟨⟩–N–[isoquinoline-1,3-dione] | yellowish red |
| 78 | ⟨⟩(NH₂)(CH₃)–NHCO–⟨⟩–N–[tetrachloroisoquinoline-1,3-dione] | red |
| 79 | H₂N–⟨⟩(Cl)–N–[isoquinoline-1,3-dione] | red |
| 80 | H₂N–⟨⟩–N–[tetrachloroisoquinoline-1,3-dione] | yellowish red |
| 81 | H₂N–⟨⟩(NH)–[quinazoline fused structure] | chestnut |

-continued

| Ex. No. | Amine | Hue |
|---|---|---|
| 82 | H₂N—⬡—NHOC—[isoindoline-1,3-dione-N-(2-Cl-phenyl)] | bluish red |
| 83 | H₂N—⬡—NHOC—[isoindoline-1,3-dione-N-(2-OCH₃-phenyl)] | bluish red |
| 84 | H₂N—⬡—NHOC—[isoindoline-1,3-dione-N-(3-Cl-4-OCH₃-phenyl)] | bluish red |
| 85 | H₂N—⬡—NHOC—[isoindoline-1,3-dione-N-(2-Cl-5-OCH₃-phenyl)] | bluish red |
| 86 | H₂N—⬡—NHOC—[isoindoline-1,3-dione-N-(3-CH₃-phenyl)] | bluish red |
| 87 | H₂N—⬡—NHOC—[isoindoline-1,3-dione-N-(4-CH₃-phenyl)] | bluish red |
| 88 | H₂N—⬡(2-OCH₃)—NHCO—⬡—[phthalimido] (meta) | bluish red |
| 89 | H₂N—⬡(3-CH₃,4-OCH₃)—NHOC—⬡(3-CH₃,4-Cl)—[phthalimido] | bluish red |
| 90 | H₂N—⬡—NHOC—⬡—[phthalimido] | bluish red |
| 91 | H₂N—⬡—NHCO—⬡ | bluish red |
| 92 | H₂N—⬡—NHCO—⬡—Cl | bluish red |
| 93 | H₂N—⬡—NHCO—⬡—OCH₃ | bluish red |
| 94 | H₂N—⬡(2-Cl)—NHCO—⬡ | bluish red |
| 95 | H₂N—⬡—NHCO—⬡(3-Br,4-OCH₃,5-Br) | bluish red |

-continued

| Ex. No. | Amine | Hue |
|---|---|---|
| 96 | H₂N–⟨C₆H₄⟩–NHC(O)–O–⟨C₆H₃⟩(Cl)(Cl) (2,5-dichlorophenyl) | bluish red |
| 97 | H₂N–⟨C₆H₄⟩–NHC(O)–O–⟨C₆H₅⟩ | bluish red |
| 98 | H₂N–⟨C₆H₄⟩–NH–C(O)–NH–⟨C₆H₅⟩ | bluish red |
| 99 | H₂N–⟨C₆H₄⟩–NH–C(O)–NH–⟨C₆H₄⟩–Cl (2-Cl) | bluish red |
| 100 | H₂N–⟨C₆H₄⟩–NH–C(O)–NH–⟨C₆H₄⟩–Cl (4-Cl) | bluish red |
| 101 | H₂N–⟨C₆H₄⟩–NHC(O)–NH–⟨C₆H₃⟩(Cl)(Cl) (2,5-dichloro) | bluish red |
| 102 | H₂N–⟨C₆H₄⟩–NH–C(O)–NH–⟨C₆H₃⟩(CH₃)(CH₃) (2,5-dimethyl) | bluish red |
| 103 | H₂N–⟨C₆H₄⟩–NH–C(O)–NH–⟨C₆H₃⟩(Cl)(OCH₃) | bluish red |
| 104 | H₂N–⟨C₆H₄⟩–NH–C(O)–HN–CH₂–⟨C₆H₅⟩ | bluish red |
| 105 | H₂N–⟨C₆H₄⟩–NHC(O)–NH–CH₃ | bluish red |
| 106 | H₂N–⟨C₆H₄⟩–NHC(O)–NH–CH(CH₃)₂ | bluish red |
| 107 | H₂N–⟨C₆H₄⟩–NHC(O)–NH–CH₂–CH(CH₃)₂ | bluish red |
| 108 | H₂N–⟨C₆H₄⟩–NH–C(O)–NH(CH₂)₃–CH₃ | bluish red |
| 109 | H₂N–⟨C₆H₄⟩–NH–C(O)–NH–CH₂–CH(OH)–CH₃ | bluish red |
| 110 | H₂N–⟨C₆H₄⟩–NH–C(O)–NH–(CH₂)₂–OCH₃ | red |
| 111 | H₂N–NH–C(O)–⟨C₆H₅⟩ | bluish red |
| 112 | H₂N–⟨C₆H₄⟩–NHCOCH₃ | bluish red |
| 113 | H₂N–⟨C₆H₄⟩–NH–C(O)–NH–⟨naphthyl⟩ | bluish red |

| Ex. No. | Amine | Hue |
|---|---|---|
| 114 | 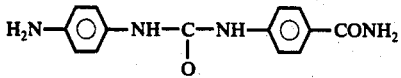 | bluish red |

We claim:
1. A compound of the formula

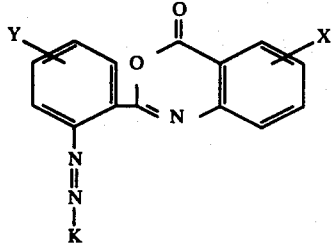

in which:
x is hydrogen, chloro, bromo, methyl or nitro;
Y is hydrogen, chloro, bromo or methyl;
K is $CH_3COCHCONHZ$ or

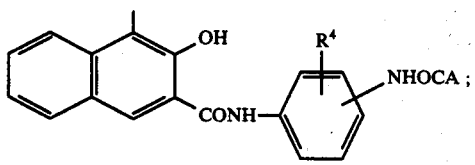

Z is phenyl substituted by chloro, bromo, methyl, ethyl, methoxy, ethoxy, acetylamino, propionylamino, benzoylamino, chlorobenzoylamino or dichlorobenzoylamino; or

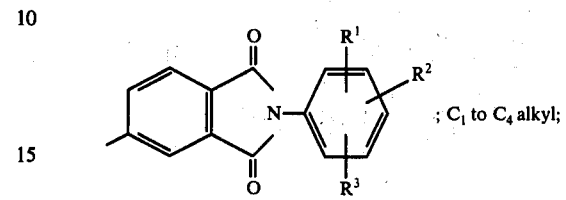; $C_1$ to $C_4$ alkyl;

$C_1$ to $C_4$ alkyl; phenyl; phenyl which is ring-substituted by chloro, bromo, methyl, ethyl, methoxy, ethoxy, cyano, carbamoyl, N-phenylcarbamoyl, N-chlorophenylcarbamoyl, N-bromophenylcarbamoyl, N-methylphenylcarbamoyl, N-methoxyphenylcarbamoyl, N-ethoxyphenylcarbamoyl, $C_1$ to $C_4$ alkoxycarbonyl or sulfamoyl; naphthyl; anthraquinonyl; amino; $C_1$ to $C_5$ alkylamino; benzylamino; phenylamino; phenylamino which is ring-substituted by chloro, bromo, methyl, ethyl, methoxy, ethoxy or carbamoyl; naphthylamino; anthraquinonylamino; phenoxy; or phenoxy substituted by chloro, bromo, methyl, ethyl, methoxy or ethoxy;
$R^1$ is hydrogen, chloro, bromo, $C_1$ to $C_4$ alkyl, $C_1$ to $C_4$ alkoxy, phenyl, methylsulfonyl, ethylsulfonyl, carbamoyl or sulfamoyl;
$R^2$ is hydrogen, chloro, bromo, methyl, ethyl, methoxy or ethoxy;
$R^3$ is hydrogen, chloro, bromo, methyl or ethyl; and
$R^4$ is hydrogen, chloro, bromo, methyl, ethyl, methoxy or ethoxy.
2. A dye as claimed in claim 1 of the formula:

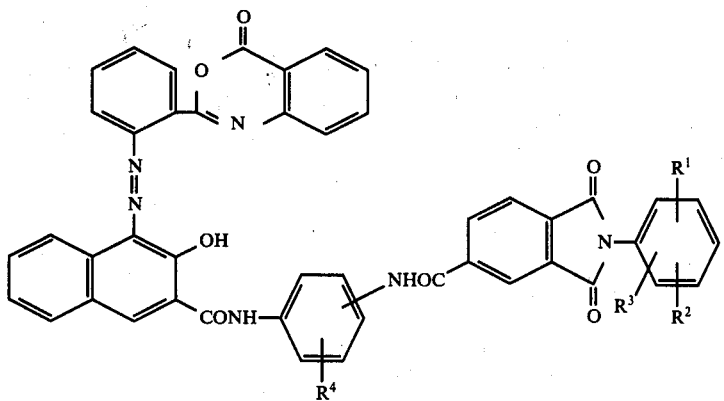

in which
$R^1$ is hydrogen, chloro, bromo, $C_1$ to $C_4$ alkyl, $C_1$ to $C_4$ alkoxy, phenyl, methylsulfonyl, ethylsulfonyl, carbamoyl or sulfamoyl;
$R^2$ is hydrogen, chloro, bromo, methyl, ethyl, methoxy or ethoxy;
$R^3$ is hydrogen, chloro, bromo, methyl or ethyl; and
$R^4$ is hydrogen, chloro, bromo, methyl, ethyl, methoxy or ethoxy.
3. A compound as claimed in claim 1 of the formula:

A is 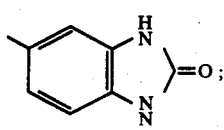

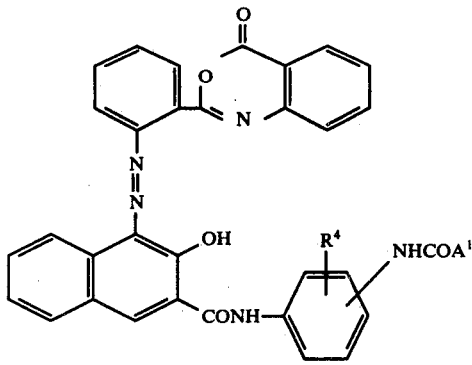

in which:
A[1] is $C_1$ to $C_4$ alkyl; phenyl substituted by chloro, bromo, methyl, ethyl, methoxy, ethoxy, cyano, carbamoyl, N-phenylcarbamoyl, N-chlorophenylcarbamoyl, N-bromophenylcarbamoyl, N-methylphenylcarbamoyl, N-methoxyphenylcarbamoyl, N-ethoxyphenylcarbamoyl, $C_1$ to $C_4$ alkoxycarbonyl or sulfamoyl; naphthyl; anthraquinonyl; amino; $C_1$ to $C_5$ alkylamino; benzylamino; phenylamino; phenylamino substituted by chloro, bromo, methyl, ethyl, methoxy, ethoxy or carbamoyl; naphthylamino; anthraquinonylamino; phenoxy; or phenoxy substituted by chloro, bromo, methyl, ethyl, methoxy or ethoxy.

4. The compound as claimed in claim 1 of the formula:

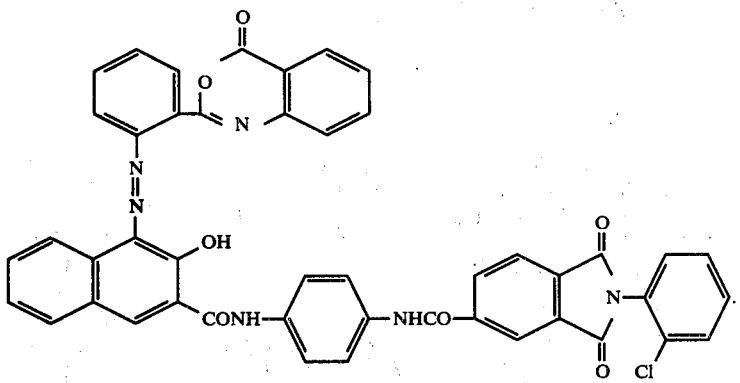

* * * * *

UNITED STATES PATENT AND TRADEMARK OFFICE
CERTIFICATE OF CORRECTION

PATENT NO. : 4,116,953
DATED : September 26, 1978
INVENTOR(S) : DIMROTH ET AL

It is certified that error appears in the above-identified patent and that said Letters Patent are hereby corrected as shown below:

In claim 1, lines 60-65, (Third structural formula), delete " $\overset{N}{N}$ " and substitute -- $\overset{N}{H}$ --.

In claim 1, line 14 of column 22, cancel the phrase after the structural formula "$C_1$ to $C_4$ alkyl;".

In the title, Cancel the title that reads "Azo Dyes" and substitute --Having a Benzoxazinone Phenyl Diazo Component--.

Signed and Sealed this

First Day of May 1979

[SEAL]

Attest:

RUTH C. MASON
Attesting Officer

DONALD W. BANNER
Commissioner of Patents and Trademarks